(12) United States Patent  
Zhang et al.

(10) Patent No.: US 11,052,774 B2
(45) Date of Patent: Jul. 6, 2021

(54) RAIL TRANSIT BRAKING ENERGY RECOVERY SYSTEM AND HYBRID POWER RAIL TRANSIT

(71) Applicant: CRRC QINGDAO SIFANG CO., LTD., Shandong (CN)

(72) Inventors: Xu Zhang, Shandong (CN); Jianying Liang, Shandong (CN); Xiaojun Deng, Shandong (CN); Kelei Li, Shandong (CN); Wenchao Zhang, Shandong (CN); Yankun Li, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 316 days.

(21) Appl. No.: 16/327,805

(22) PCT Filed: Aug. 22, 2017

(86) PCT No.: PCT/CN2017/098488
§ 371 (c)(1),
(2) Date: Feb. 22, 2019

(87) PCT Pub. No.: WO2018/036484
PCT Pub. Date: Mar. 1, 2018

(65) Prior Publication Data
US 2019/0225089 A1  Jul. 25, 2019

(30) Foreign Application Priority Data
Aug. 23, 2016 (CN) .......................... 201610708539.1

(51) Int. Cl.
*H02J 7/00* (2006.01)
*B60L 50/70* (2019.01)
(Continued)

(52) U.S. Cl.
CPC ................. *B60L 50/70* (2019.02); *B60L 7/22* (2013.01); *B60L 58/30* (2019.02); *H02J 7/022* (2013.01); *H02J 7/14* (2013.01); *Y02T 10/70* (2013.01)

(58) Field of Classification Search
None
See application file for complete search history.

(56) References Cited

U.S. PATENT DOCUMENTS 5,583,406 A   12/1996   Mutoh et al.
6,211,643 B1 * 4/2001   Kagatani ............ H01M 8/0656
                                                    320/101
(Continued)

FOREIGN PATENT DOCUMENTS

CN   102259595 A   11/2011
CN   203368115 U   12/2013
(Continued)

OTHER PUBLICATIONS

Chinese language International Search Report and the Written Opinion of the International Searching Authority for International Application No. PCT/CN2017/098488 dated Nov. 27, 2018.
(Continued)

*Primary Examiner* — Arun C Williams
(74) *Attorney, Agent, or Firm* — Womble Bond Dickinson (US) LLP

(57) ABSTRACT

A rail transit braking energy recovery system. The rail transit braking energy recovery system comprises a braking motor, a fuel battery, an electrolytic bath, and a hydrogen tank. The braking motor is used for converting braking energy of the rail transit into electric energy. An output end of the braking motor is connected to a power input end of the electrolytic bath. The electrolytic bath comprises a hydrogen output end and an oxygen output end, the hydrogen output end is connected to the hydrogen tank, and the hydrogen tank is
(Continued)

connected to the fuel battery and is used for supplying hydrogen to the fuel battery. In the system, only the electrolytic bath is structurally added, and the existing vehicle-mounted hydrogen tank is directly used for storing hydrogen, therefore the structure is simple, the self weight of the vehicle body is reduced, the energy conversion efficiency is high, and at the same time, the injection of hydrogen is reduced and the operation cost is reduced. In addition, the purity of the hydrogen obtained by means of electrolysis is high, so that the hydrogen can be directly supplied to the fuel battery to be used without being processed. Also provided is a hybrid power rail transit system.

8 Claims, 1 Drawing Sheet

(51) Int. Cl.
*B60L 7/22* (2006.01)
*B60L 58/30* (2019.01)
*H02J 7/02* (2016.01)
*H02J 7/14* (2006.01)

(56) References Cited

U.S. PATENT DOCUMENTS

| | | | |
|---|---|---|---|
| 2002/0095247 A1* | 7/2002 | Ding | B60L 58/34 701/22 |
| 2003/0091503 A1* | 5/2003 | Rosenfeld | B60L 53/51 423/657 |
| 2005/0008904 A1* | 1/2005 | Suppes | H01M 8/186 429/9 |
| 2007/0138006 A1* | 6/2007 | Oakes | H01M 8/0606 204/278 |
| 2008/0121136 A1* | 5/2008 | Mari | B61C 5/00 105/35 |
| 2010/0005802 A1* | 1/2010 | Francis | F22B 1/30 60/671 |
| 2010/0082192 A1* | 4/2010 | Hofbauer | B60L 50/16 701/22 |

FOREIGN PATENT DOCUMENTS

| | | |
|---|---|---|
| CN | 104283428 A | 1/2015 |
| CN | 1042834283428 A | 1/2015 |
| CN | 106080215 A | 11/2016 |
| CN | 205970877 U | 2/2017 |
| DE | 102014005982 A1 | 11/2014 |

OTHER PUBLICATIONS

English translation of the International Search Report for International Application No. PCT/CN2017/098488 dated Nov. 27, 2018.
The First Office Action of Chinese Application No. 201610708539.1, dated Nov. 16, 2017, 11 pages.
The International Search Report and Written Opinion of PCT Application No. PCT/CN2017/098488 dated Nov. 27, 2017, 14 pages.
The International Preliminary Report on Patentability of PCT Application No. PCT/CN2017/098488 dated Feb. 26, 2019, 5 pages.

* cited by examiner

RAIL TRANSIT BRAKING ENERGY RECOVERY SYSTEM AND HYBRID POWER RAIL TRANSIT

CROSS-REFERENCE TO RELATED APPLICATIONS

This patent application is a U.S. National Phase Application under 35 U.S.C. § 371 of International Application No. PCT/CN2017/098488, filed 22 Aug. 2017, entitled RAIL TRANSIT BRAKING ENERGY RECOVERY SYSTEM AND HYBRID POWER RAIL TRANSIT, which claims priority to Chinese Patent Application No. 2016107085391, filed on Aug. 23, 2016, entitled "Rail Transit Braking Energy Recovery System and Hybrid Power Rail Transit", the disclosure of which was incorporated by reference in the entirety.

FIELD OF TECHNOLOGY

The present disclosure relates to the technical field of rail transit energy-saving, and particularly to a rail transit braking energy recovery system and a hybrid power rail transit.

BACKGROUND

The existing conventional rail transit braking energy recovery technology is mainly divided into three types: an energy storage type (energy storage with accumulators, energy storage with flywheels and energy storage with capacitors), an inversion type (the inversion feedback and the inversion load) and a resistance consumption type. A recovery device of the energy storage type is usually large in volume. For the hybrid power rail transit, the system already has the accumulator or/and the capacitors, which is relatively suitable for the energy storage technologies other than flywheels. However, the DC/DC converter installed additionally during the recovery process will greatly reduce the overall recovery efficiency. For the rail transit driven by the pure fuel battery, the additional installation of energy storage devices will increase the weight of the vehicle and make the interior space thereof more compact, which not only increases the complexity of the entire vehicle system, but also reduces the braking energy recovery efficiency. The hybrid power rail transit has canceled the pantograph device, therefore the inversion feedback type is not applicable; the inversion load type is relatively simple, but since the brake of a train is intermittent, the power consumption stability of the load is not guaranteed. Therefore this type is rarely used. The resistance consumption type is easily to be controlled, low in price and stable in operation. However, all of the energy is consumed as thermal energy, which not only forms thermal pollution, but also increases the power consumption of the air conditioning system. In essence, the braking energy is not recovered and the comprehensive use efficiency of energy is greatly reduced. The hybrid power rail transit uses the fuel battery as the power unit and uses hydrogen as a fuel. The train has a gas cylinder storing hydrogen, which provides a favorable storage place for the hydrogen produced by electrolyzing water with the braking energy.

SUMMARY

(I) Technical Problem to be Solved

The technical problem to be solved by the present disclosure is how to achieve the braking energy recovery of the rail transit.

(II) Technical Solutions

In order to solve the technical problem above, the present disclosure provides a rail transit braking energy recovery system, including a braking motor, a fuel battery, an electrolytic bath, and a hydrogen tank; wherein the braking motor is configured to convert braking energy of the rail transit into electric energy, and an output end of the braking motor is connected to a power input end of the electrolytic bath; the electrolytic bath includes a hydrogen output end and an oxygen output end, the hydrogen output end being connected to the hydrogen tank, and the hydrogen tank being connected to the fuel battery for supplying hydrogen to the fuel battery.

According to the present disclosure, the system further includes a control device and an energy storage device connected to the output end of the braking motor; the control device is configured to control a current output of the braking motor so that the current is output to the electrolytic bath or the energy storage device.

According to the present disclosure, the energy storage device is a lithium battery or a super capacitor.

According to the present disclosure, the hydrogen tank is connected with a hydrogen pressure sensor.

According to the present disclosure, the output end of the braking motor is connected to the electrolytic bath through a rectifier module and a voltage regulator module.

According to the present disclosure, the system further includes a braking resistor connected to the braking motor.

The present disclosure also provides a hybrid power rail transit, including an entire vehicle air supply system, an entire vehicle power supply system and the rail transit braking energy recovery system above; wherein the oxygen output end is connected to the entire vehicle air supply system, and the fuel battery is connected to the entire vehicle power supply system.

According to the present disclosure, the system further includes a heat dissipation system for dissipating heat of the fuel battery and the electrolytic bath.

(III) Advantageous Effects

Compared to the prior art, the technical solutions of the present disclosure above have the following advantages: the rail transit braking energy recovery system provided by the embodiments of the present disclosure is provided with the electrolytic bath that converts the braking energy recovered by the braking motor into electric energy for electrolyzing water, by which the generated hydrogen is sent to the hydrogen tank and can be used as a hydrogen source of the fuel battery, and the generated oxygen can be introduced into the vehicle to increase the oxygen concentration in the air within the vehicle, so as to improve the air quality of the entire vehicle. When the braking energy recovery system provided by the embodiments of the present disclosure is applied to a hybrid power rail transit system, on the basis of the characteristic that the hybrid power rail transit vehicle has the hydrogen tank, only the electrolytic bath needs to be structurally added and the existing vehicle-mounted hydrogen tank is directly used for storing hydrogen, therefore the structure is simple, the self weight of the vehicle body is reduced, the energy conversion efficiency is high, and at the same time, the injection of hydrogen is reduced and the operation cost is reduced. In addition, the purity of the hydrogen obtained by means of electrolysis is high, so that the hydrogen can be directly supplied to the fuel battery to be used without being processed.

Figure 1:
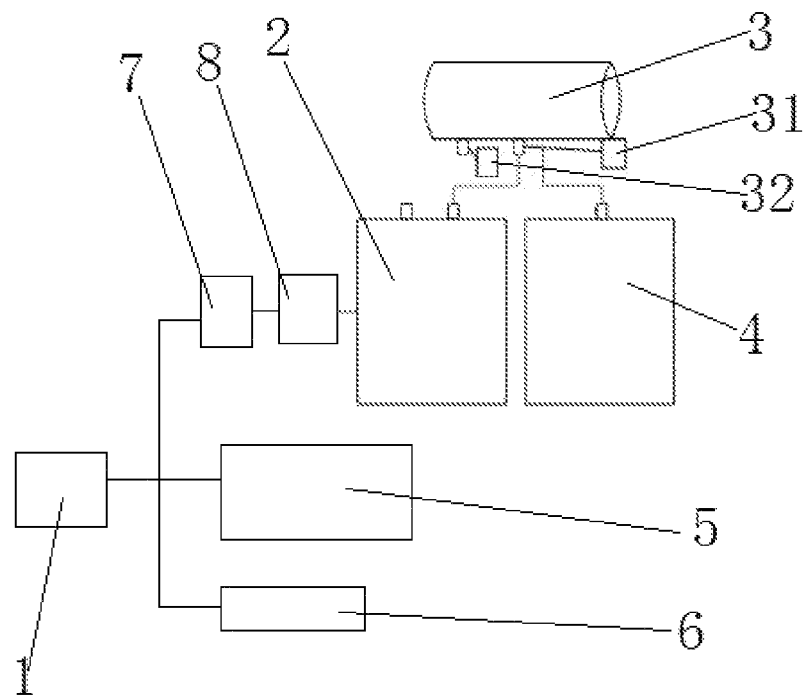
FIG. 1 is a structural diagram of the rail transit braking energy recovery system provided by an embodiment of the present disclosure.

In the drawings: 1: braking motor; 2: electrolytic bath; 3: hydrogen tank; 31: hydrogen pressure sensor; 32: hydrogen leakage sensor; 4: fuel battery; 5: energy storage device; 6: braking resistor; 7: rectifier module; 8: voltage regulator module; 9: control device; 10: entire vehicle air supply system; 11: entire vehicle power supply system; 12: air compressor; 13: heat dissipation system.

DETAILED DESCRIPTION

In order to make the objectives, technical solutions, and advantages of the embodiments of the present disclosure clearer, the technical solutions of the embodiments of the present disclosure will be described clearly with reference to the accompanying drawings hereinafter. Obviously, the described embodiments are merely a part but not all of the embodiments of the present disclosure. On the basis of the embodiments of the present disclosure, all other embodiments obtained by the person of ordinary skill in the art without creative work shall fall within the protection scope of the present disclosure.

As shown in FIG. 1, a rail transit braking energy recovery system provided by the embodiments of the present disclosure includes a braking motor 1, a fuel battery 4, an electrolytic bath 2 and a hydrogen tank 3. The braking motor 1 is configured to convert braking energy of the rail transit into electric energy, and an output end of the braking motor 1 is connected to a power input end of the electrolytic bath 2. Preferably, in the present embodiment, the output end of the braking motor 1 is connected to the electrolytic bath 2 through a rectifier module 7 and a voltage regulator module 8. The electrolytic bath 2 includes a hydrogen output end and an oxygen output end. The oxygen output end is configured to output oxygen produced by means of electrolysis in the electrolytic bath 2. The hydrogen output end is connected to the hydrogen tank 3, which is connected to the fuel battery 4 and is configured to supply hydrogen to the fuel battery 4. Water in the electrolytic bath 2 can be either water stored in the vehicle or collected water produced in other processes. The rail transit braking energy recovery system provided by the embodiments of the present disclosure is provided with the electrolytic bath 2 that converts the braking energy recovered by the braking motor 1 into electric energy for electrolyzing water, whereby the generated hydrogen is sent to the hydrogen tank 3 and can be used as a hydrogen source of the fuel battery 4, and the generated oxygen can be introduced into the vehicle to increase the oxygen concentration in the air within the vehicle, so as to improve the air quality of the entire vehicle. When the braking energy recovery system provided by the embodiments of the present disclosure is applied to a hybrid power rail transit system, on the basis of the characteristic that the hybrid power rail transit vehicle has the hydrogen tank 3, only the electrolytic bath 2 needs to be structurally added and the existing vehicle-mounted hydrogen tank 3 is directly used for storing hydrogen, therefore the structure is simple, the self weight of the vehicle body is reduced, the energy conversion efficiency is high, and at the same time, the injection of hydrogen is reduced and the operation cost is reduced. In addition, the purity of the hydrogen obtained by means of electrolysis is high, so that the hydrogen can be directly supplied to the fuel battery to be used without being processed.

Further, the rail transit braking energy recovery system in the present embodiment further includes a control device 9 and an energy storage device 5 connected to the output end of the braking motor 1. The control device 9 is configured to control a current output of the braking motor 1, so that the current is output to the electrolytic bath 2 or the energy storage device 5. Specifically, the energy storage device 5 in the present disclosure may be a conventional energy storage device, such as a lithium battery or a super capacitor etc. The energy storage device 5 can be selected according to the actual characteristics of the hybrid power rail transit, which is not limited in the embodiments of the present disclosure. The control device 9 can determine whether the electric energy output from the braking motor 1 is used for the electrolysis by the electrolytic bath 2 or stored by the energy storage device 5.

Further, the hydrogen tank 3 in the present embodiment is connected with a hydrogen pressure sensor 31. The hydrogen pressure sensor 31 is configured to control the braking motor 1 to be connected to the energy storage device 5 when it detects that the pressure within the hydrogen tank 3 is higher than a limit value, and control the braking motor 1 to be connected to the electrolytic bath 2 when it detects that the pressure within the hydrogen tank 3 is not higher than the limit value, so as to electrolyze and the hydrogen is collected by the hydrogen tank 3. The hydrogen tank 3 in the present embodiment is further connected with a hydrogen leakage sensor 32. The hydrogen leakage sensor 32 is configured to detect whether the hydrogen tank 3 is leaking.

Further, the rail transit braking energy recovery system in the present embodiment further includes a braking resistor 6 connected to the braking motor 1. The braking resistor 6 directly converts the regenerated electric energy of the braking motor 1 into thermal energy during the rapid braking process, so that the regenerated electric energy is not fed back into the electric network of the power source, which will not cause voltage fluctuations of the electric network, thereby ensuring a smooth operation of the electric network of the power source.

Figure 2:
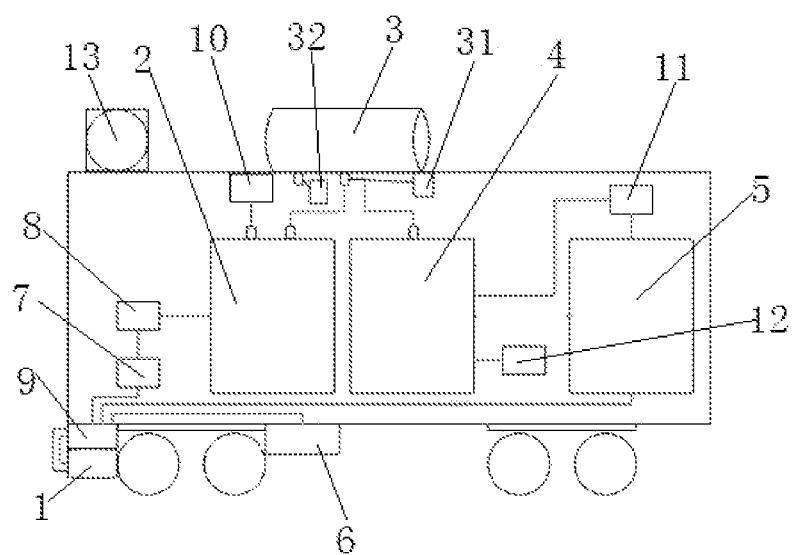
FIG. 2 is a structural diagram of the hybrid power rail transit provided by an embodiment of the present disclosure.

The embodiments of the present disclosure also provide a hybrid power rail transit, as shown in FIG. 2, including an entire vehicle air supply system 10, an entire vehicle power supply system 11 and the rail transit braking energy recovery system above. The oxygen output end is connected to the entire vehicle air supply system 10 and the fuel battery 4 is connected to the entire vehicle power supply system 11. The connection between the oxygen output end and the entire vehicle air supply system 10 can improve the oxygen concentration in the air of the entire vehicle and improve the air quality of the entire vehicle. Further, the hybrid power rail transit of the present embodiment further includes a heat dissipation system 13 for dissipating heat of the fuel battery 4 and the electrolytic bath 2, so as to ensure the normal operations of the fuel battery 4 and the electrolytic bath 2.

Further, the fuel battery 4 of the present embodiment is further connected with an air compressor 12 for supplying oxygen to the fuel battery 4.

Finally, it should be noted that the embodiments above are only used to illustrate rather than to limit the technical solutions of the present disclosure; although the present disclosure has been described in detail with reference to the foregoing embodiments, those of ordinary skill in the art should understand that they can still modify the technical solutions described in the foregoing embodiments, or equivalently replace some of the technical features therein; and these modifications or replacements do not separate the essence of the corresponding technical solutions from the spirit and scope of the technical solutions of each of the embodiments of the present disclosure.

What is claimed is:

1. A rail transit braking energy recovery system, comprises a braking motor, a fuel battery, an electrolytic bath, and a hydrogen tank; wherein the braking motor is configured to convert braking energy of the rail transit into electric energy, and an output end of the braking motor is connected to a power input end of the electrolytic bath; the electrolytic bath comprises a hydrogen output end and an oxygen output end, the hydrogen output end being connected to the hydrogen tank and the hydrogen tank being connected to the fuel battery for supplying hydrogen to the fuel battery.

2. The rail transit braking energy recovery system of claim 1, further comprises a control device and an energy storage device connected to the output end of the braking motor; the control device is configured to control a current output of the braking motor so that the current is output to the electrolytic bath or the energy storage device.

3. The rail transit braking energy recovery system of claim 2, wherein the energy storage device is a lithium battery or a super capacitor.

4. The rail transit braking energy recovery system of claim 2, wherein the hydrogen tank is connected with a hydrogen pressure sensor.

5. The rail transit braking energy recovery system of claim 1, wherein the output end of the braking motor is connected to the electrolytic bath through a rectifier module and a voltage regulator module.

6. The rail transit braking energy recovery system of claim 1, further comprising a braking resistor connected to the braking motor.

7. A hybrid power rail transit, comprises an entire vehicle air supply system, an entire vehicle power supply system and a rail transit braking energy recovery system of comprising a braking motor, a fuel battery, an electrolytic bath, and a hydrogen tank; wherein the braking motor is configured to convert braking energy of the rail transit into electric energy, and an output end of the braking motor is connected to a power input end of the electrolytic bath; the electrolytic bath comprises a hydrogen output end and an oxygen output end, the hydrogen output end being connected to the hydrogen tank and the hydrogen tank being connected to the fuel battery for supplying hydrogen to the fuel battery; wherein the oxygen output end is connected to the entire vehicle air supply system, and the fuel battery is connected to the entire vehicle power supply system.

8. The hybrid power rail transit of claim 7, further comprising a heat dissipation system for dissipating heat of the fuel battery and the electrolytic bath.

\* \* \* \* \*